Figure 1:
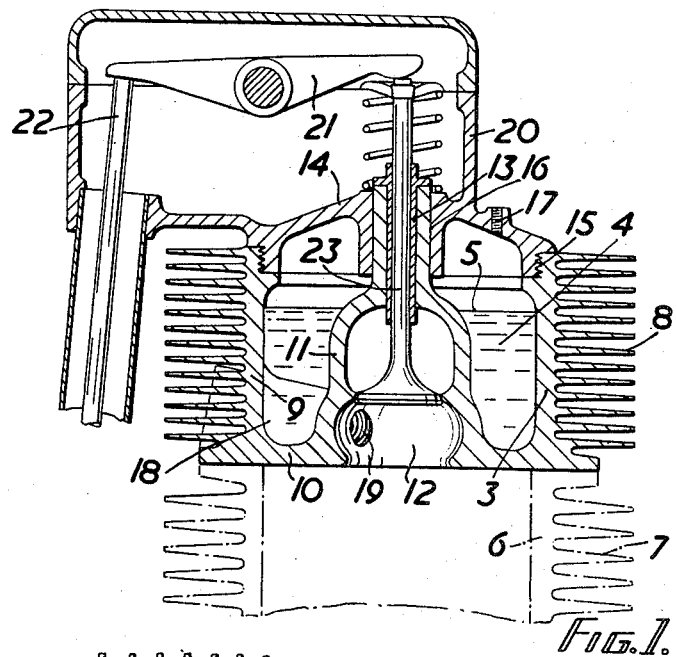

May 29, 1951  D. R. POBJOY  2,554,921

INTERNAL-COMBUSTION ENGINE

Filed March 5, 1949

Inventor
DOUGLAS RUDOLF POBJOY, DECEASED,
BY ELAINE B. POBJOY, EXECUTRIX
Young, Emery & Thompson Attorneys Patented May 29, 1951

2,554,921

UNITED STATES PATENT OFFICE 2,554,921

INTERNAL-COMBUSTION ENGINE

Douglas Rudolf Pobjoy, deceased, late of Woodmancote, Cheltenham, England, by Elaine B. Pobjoy, executrix, Englefield Green, England Application March 5, 1949, Serial No. 79,803
In Great Britain March 1, 1948

7 Claims. (Cl. 123—41.75)

This invention relates to internal combustion engines and is concerned with the cooling arrangements thereof.

Considerably higher power outputs may be obtained from the cylinders of liquid-cooled engines than from corresponding air-cooled cylinders because of the substantially greater rate at which heat can be conducted away from regions of intense local heating by the liquid cooling medium. The conventional liquid cooling system, however, involves the use of a separate radiator and associated pipework through which the liquid is circulated.

The primary object of the present invention is to provide a new or improved cooling arrangement for the cylinders of internal combustion engines which will enable all the advantages of liquid cooling to be obtained without the disadvantage of having to provide a separate radiator and pipes to form a circulating system.

With this object in view the invention contemplates substantially increasing the thermal conductivity, or rather the "transmissivity," of the cylinder in the regions of intense local heating, and is based on the knowledge that the thermal transmissivity of a liquid, under the conditions with which the present invention is concerned, increases rapidly as it approaches its critical temperature and pressure and attains a value many times greater than that of pure copper.

The invention accordingly comprises a cooling arrangement for the cylinders of internal combustion engines wherein at least that portion of the cylinder subjected to intense local heating is chambered or jacketed, the chamber being partially filled with a liquid of moderate critical temperature and pressure and hermetically sealed. Preferably the outside of the chamber or jacket is finned to increase the rate of heat dissipation to the ambient atmosphere.

The invention is not confined to the use of any particular liquid, but examples of suitable liquids are benzene, ethyl alcohol, ethyl chloride and toluene. Water may be found rather unsuitable as the critical temperature and pressure (374° C. and 3200 lbs./sq. in.) are somewhat high.

Although the complete cylinder may, if desired, be provided with the partially liquid-filled and hermetically-sealed chamber or jacket, preferably only those portions of the cylinder subjected to intense local heating, for example the cylinder head of an overhead valve engine or the barrel in the vicinity of the valve ports in the case of a side valve engine, are so treated.

Figure 2:
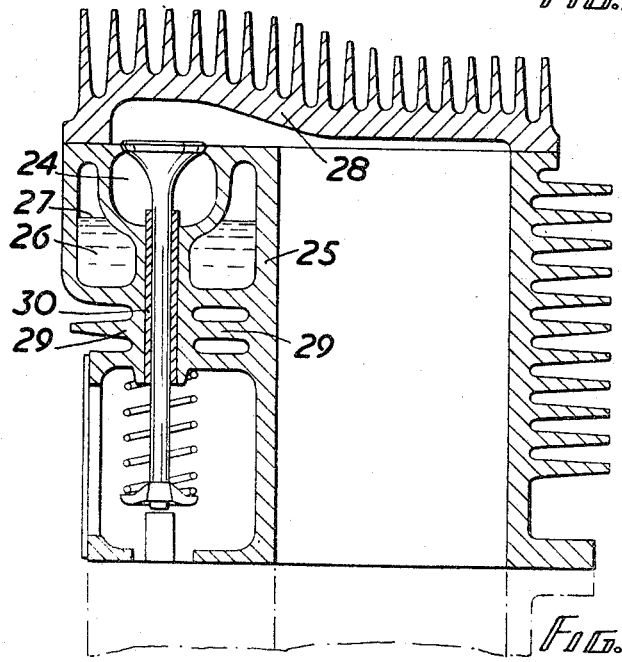

Two such examples of the practical application of the invention will now be described with reference to the accompanying drawings, in which:

Figure 1 is a vertical section through a cylinder head of an overhead valve engine of the Diesel type constructed in accordance with the invention, and Figure 2 is a similar view through a side valve petrol engine showing the cylinder barrel in the region of intense local heating in the vicinity of the valve ports treated in accordance with the invention, the cylinder head in this embodiment being merely finned in accordance with usual air-cooling practice.

Referring to Figure 1, in applying the invention to the cylinder of a Diesel engine, the cylinder head 3 only is formed with a chamber or jacket 4 which is nearly filled with a liquid, as indicated at 5, and hermetically sealed in order to prevent loss of the liquid therefrom either in the liquid or gaseous state. The cylinder barrel 6 is merely finned, as indicated in broken lines at 7. The outside of the chamber or jacket 4 is also preferably provided with heavy finning 8 in order to increase the rate at which heat is dissipated therefrom.

The cylinder head 3 is of such construction that the interior of the chamber or jacket 4 can be cleaned and impregnated or tinned before filling and sealing. Thus, the cylinder head is constructed in two pieces one of which comprises a cylindrical wall 9, base 10 and re-entrant portion 11 upstanding from the base to form the spraying chamber 12 and to receive the valve guides 13 at its upper end, while the other piece comprises a cap 14 which closes the upper open end of the first piece. The cap is screwed to the other piece at the upper end of the cylindrical side wall, as shown at 15, and is sweated thereto at 16 around the valve guides 13 in order to ensure an absolutely tight joint.

By reason of the liquid content of the chamber or jacket 4 which envelops the portions of the re-entrant portion which are subjected to intense local heating, a high rate of heat transmission from the hot wall of the re-entrant portion 11 of the cylinder head results as the critical temperature of the liquid is approached. The liquid chosen should, therefore, have a moderate critical temperature in order to obtain optimum results. Nevertheless it is desirable that the critical temperature of the liquid should be higher than the maximum temperature of the portion 11 of the cylinder head with a view to reducing the risk of high pressures being developed within the chamber or jacket 4. The possibility of unduly high pressures in the chamber or jacket may be avoided by the choice of liquids having low critical pressures. Benzene, ethyl alcohol, ethyl chloride and toluene are examples of liquids having the required order of critical temperatures and pressures, a particularly suitable example being toluene (320° C. and 610 lbs./sq. in.).

A hole 17 is provided in the cap 14 through which the liquid is poured into the chamber or jacket 4 formed by the two pieces after which the hole is plugged. The fins 8 are integral with the cylindrical side wall 9 and a tunnel 18 passes through the fins 8, wall 9 and the chamber or jacket 4 to permit passage of the fuel injector the inner end of which is received in a hole 19 in the wall of the spraying chamber 12. Also integrally formed with the cap is a rocker box 20, a rocker 21 and push-rod 22 being indicated for operation of the valve 23.

As illustrated in Figure 2, when the invention is applied to a side valve petrol engine having the valve ports 24 integral with the cylinder barrel 25, the latter is provided with a chamber or jacket 26 at least in the region of the valve ports, the chamber being partially filled with the liquid as already described and as indicated at 27. The cylinder head 28 may merely be finned. This arrangement avoids the overheating and cracking of the barrel 25 which otherwise occurs due to the irregular wall form and poor conductivity in the region of the valve ports 24 when engines of this type with normal air cooling are operated at high powers.

As an additional aid to transmitting the heat away from the highly heated locality around the valve ports 24 and from the chamber or jacket 26 heavy finning 29 for the latter is provided below its bottom wall, the finning surrounding the valve guide 30.

In both of the embodiments described the invention avoids the necessity for a separate radiator and permits as high powers being taken from the direct-cooled cylinder as from a corresponding cylinder provided with a normal water cooling system.

What is claimed is:

1. In an internal combustion engine, a cylinder of which at least that portion subjected to intense local heating is formed with a hermetically sealed chamber, and a liquid of moderate critical temperature and pressure contained within said chamber in such quantity as to provide a liquid path for heat transmission from all parts of said cylinder portion to an outer wall of the chamber, such moderate critical temperature of the liquid being higher than the maximum operating temperature of said cylinder portion whereby as a result of the heat generated by the engine the liquid approaches its critical temperature and pressure under which condition it has a thermal conductivity many times greater than in its normal state.

2. In an internal combustion engine, a cylinder of which at least that portion subjected to intense local heating is formed with a hermetically sealed chamber, and a liquid having a critical temperature between 150° C. and 350° C. and a critical pressure between 15 lbs./sq. in. and 1000 lbs./sq. in. contained within said chamber in such quantity as to envelop said cylinder portion and provide a liquid path for heat transmission from all parts of said cylinder portion to an outer wall of the chamber.

3. In an internal combustion engine, a cylinder of which at least that portion subjected to intense local heating is formed with a hermetically sealed chamber, and a body of toluene contained within said chamber in such quantity as to envelop said cylinder portion and provide a liquid path for heat transmission from all parts of said cylinder portion to an outer wall of the chamber.

4. An internal combustion engine according to claim 1, wherein the external surface of the outer wall of the chamber is finned to increase the rate of heat dissipation to the ambient atmosphere.

5. For an internal combustion engine, a cylinder head comprising in combination a substantially cylindrical outer wall and a re-entrant portion providing an inner wall, a cap associated with said outer and inner walls to hermetically seal the chamber formed between said outer and inner walls, and cooling means including a liquid of moderate critical temperature and pressure contained within said chamber to a depth sufficient to envelop said inner wall and provide a liquid path for heat transmission from said inner wall to said outer wall.

6. For an internal combustion engine of the Diesel type, a cylinder head comprising in combination a member which forms a substantially cylindrical outer wall, a base and a re-entrant portion upstanding from said base to form a spraying chamber, a cap to hermetically close the open upper end of said member and form a closed chamber between said outer wall and said spraying chamber, and cooling means including a liquid having a critical temperature between 150° C. and 350° C. and a critical pressure between 15 lbs./sq. in. and 1000 lbs./sq. in. which does not completely fill said chamber but submerges said spraying chamber.

7. For an internal combustion engine, a cylinder barrel having valve ports integral therewith and formed to provide a hermetically sealed chamber in the region of said valve ports, and cooling means for the latter including a liquid of moderate critical temperature and pressure which does not quite fill said chamber.

ELAINE B. POBJOY,
*Executrix of the Estate of Douglas Rudolf Pobjoy, Deceased.*

REFERENCES CITED

The following references are of record in the file of this patent:

UNITED STATES PATENTS

| Number | Name | Date |
|---|---|---|
| 1,341,478 | Platt et al. | May 25, 1920 |
| 1,763,082 | Bauer et al. | June 10, 1930 |
| 1,820,628 | Niven | Aug. 25, 1931 |
| 1,867,683 | Sperry | July 19, 1932 |
| 2,028,434 | Bernard | Jan. 21, 1936 |

FOREIGN PATENTS

| Number | Country | Date |
|---|---|---|
| 625,737 | France | 1927 |